United States Patent
Lee et al.

(10) Patent No.: US 12,237,517 B2
(45) Date of Patent: Feb. 25, 2025

(54) BATTERY CASE FOR SECONDARY BATTERY AND POUCH TYPE SECONDARY BATTERY

(71) Applicant: LG Energy Solution, Ltd., Seoul (KR)

(72) Inventors: Sang Kyun Lee, Daejeon (KR); Min Soo Park, Daejeon (KR); Young Ha Kim, Daejeon (KR); Young Hoon Hong, Daejeon (KR); Seong Hyun Kim, Daejeon (KR); Eui Jin Hong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 635 days.

(21) Appl. No.: 17/606,953

(22) PCT Filed: Mar. 31, 2020

(86) PCT No.: PCT/KR2020/004425
§ 371 (c)(1),
(2) Date: Oct. 27, 2021

(87) PCT Pub. No.: WO2020/242034
PCT Pub. Date: Dec. 3, 2020

(65) Prior Publication Data
US 2022/0209335 A1 Jun. 30, 2022

(30) Foreign Application Priority Data
May 31, 2019 (KR) .................. 10-2019-0064786

(51) Int. Cl.
*H01M 50/105* (2021.01)
*H01M 10/04* (2006.01)
*H01M 50/46* (2021.01)

(52) U.S. Cl.
CPC ..... *H01M 50/105* (2021.01); *H01M 10/0459* (2013.01); *H01M 50/46* (2021.01)

(58) Field of Classification Search
CPC . H01M 50/46; H01M 50/105; H01M 10/0459
See application file for complete search history.

(56) References Cited

U.S. PATENT DOCUMENTS 8,709,645 B2 4/2014 Roy
2009/0311592 A1 12/2009 You et al.
(Continued)

FOREIGN PATENT DOCUMENTS

CN 111989795 A 11/2020
EP 3770987 A1 1/2021
(Continued)

OTHER PUBLICATIONS

International Search Report for Application No. PCT/KR2020/004425, Dated Jul. 8, 2020, 3 pages.
(Continued)

*Primary Examiner* — Matthew T Martin
*Assistant Examiner* — Unique Jenevieve Luna
(74) *Attorney, Agent, or Firm* — Lerner David LLP

(57) ABSTRACT

A pouch type battery case for a secondary battery, which accommodates an electrode assembly, in which electrodes and separators are stacked, includes a first cup part and a second cup part, which are recessed in a pouch film, respectively; an accommodation part, which is provided in a longitudinal direction of edges of the first cup part and the second cup part, which face each other, between the first cup part and the second cup part and in which one side of the electrode assembly is configured to be accommodated; inclined parts extending from opposing ends, respectively, of the accommodation part and provided to be recessed in the pouch film; and line forming parts extending linearly from outer ends, respectively, of the respective inclined parts (Continued)

and provided to be recessed in the pouch film in the same direction as the longitudinal direction of the accommodation part.

15 Claims, 14 Drawing Sheets

(56) References Cited

U.S. PATENT DOCUMENTS

| | | |
|---|---|---|
| 2013/0011721 A1 | 1/2013 | Kim et al. |
| 2013/0101894 A1 | 4/2013 | Baba et al. |
| 2018/0138565 A1* | 5/2018 | Lee .................. H01M 10/6554 |
| 2018/0219245 A1 | 8/2018 | Choi et al. |
| 2019/0027714 A1 | 1/2019 | Jung et al. |
| 2019/0312237 A1 | 10/2019 | Moon et al. |
| 2019/0386330 A1 | 12/2019 | Choi et al. |
| 2020/0365836 A1 | 11/2020 | Jung et al. |
| 2021/0066676 A1 | 3/2021 | Jung et al. |
| 2021/0257695 A1 | 8/2021 | Kim et al. |
| 2022/0115687 A1 | 4/2022 | Choi et al. |

FOREIGN PATENT DOCUMENTS

| | | |
|---|---|---|
| JP | 2009533834 A | 9/2009 |
| JP | 2013546136 A | 12/2013 |
| JP | 2018527719 A | 9/2018 |
| JP | 2019500734 A | 1/2019 |
| KR | 100624959 B1 | 9/2006 |
| KR | 20070102768 A | 10/2007 |
| KR | 100869377 B1 | 11/2008 |
| KR | 100895202 B1 | 5/2009 |
| KR | 20170052061 A | 5/2017 |
| KR | 20180029856 A | 3/2018 |
| KR | 20180085185 A | 7/2018 |
| KR | 20180113378 A | 10/2018 |
| KR | 20180123901 A | 11/2018 |
| KR | 101927262 B1 | 12/2018 |
| KR | 20190010434 A | 1/2019 |
| WO | 2007119950 A1 | 10/2007 |
| WO | WO-2017078437 A1 * | 5/2017 .......... H01M 10/045 |
| WO | 2019017637 A1 | 1/2019 |

OTHER PUBLICATIONS

Extended European Search Report for Application No. 20813729.9 dated May 31, 2022. 6 pgs.

Search Report dated Dec. 21, 2022 from the Office Action for Chinese Application No. 202080029622.0 issued Dec. 28, 2022, 3 pages. [See p. 1-2, categorizing the cited references].

* cited by examiner

BATTERY CASE FOR SECONDARY BATTERY AND POUCH TYPE SECONDARY BATTERY

CROSS-REFERENCE TO RELATED APPLICATION

The present application is a national phase entry under U.S.C. § 371 of International Application No. PCT/KR2020/004425, filed on Mar. 31, 2020, published in Korean, which claims the benefit of the priority of Korean Patent Application No. 10-2019-0064786, filed on May 31, 2019, both of which are hereby incorporated by reference in their entireties.

TECHNICAL FIELD

The present invention relates to a battery case for a secondary battery and a pouch type secondary battery, and more particularly, a battery case for a secondary battery, in which an error in size is reduced, and a ratio of an energy density to a volume increases, and a pouch type secondary battery.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In order to manufacture an electrode assembly, a cathode, a separator, and an anode are manufactured and stacked. Specifically, cathode active material slurry is applied to a cathode collector, and anode active material slurry is applied to an anode collector to manufacture a cathode and an anode. Also, when the separator is interposed and stacked between the manufactured cathode and anode, unit cells are formed. The unit cells are stacked on each other to form an electrode assembly. Also, when the electrode assembly is accommodated in a specific case, and an electrolyte is injected, the secondary battery is manufactured.

Such a secondary battery is classified into a pouch type secondary battery and a can type secondary battery according to a material of a battery case accommodating an electrode assembly. In the pouch type secondary battery, the electrode assembly is accommodated in a pouch made of a flexible polymer material having a variable shape. Also, in the can type secondary battery, an electrode assembly is accommodated in a case made of a metal or plastic material having a predetermined shape.

The pouch type battery case is manufactured by performing drawing molding on a pouch film having flexibility to form a cup part. The drawing molding is performed by inserting a pouch film into a press and applying a pressure to the pouch film through a punch to stretch the pouch film. In addition, when the cup part is formed, an electrode assembly is accommodated in an accommodation space of the cup part, and then, the battery case is folded to seal a sealing part, thereby manufacturing a secondary battery.

When the cup part is molded in the pouch film, two cup parts that are symmetrical to each other may be drawn and molded to be adjacent to each other in one pouch film. Also, the electrode assembly may be accommodated in the accommodation space of the one cup part, and then, the battery case may be folded so that the two cup parts face each other. As a result, since the two cup parts accommodate the one electrode assembly, the electrode assembly having a thickness thicker than of an electrode assembly accommodated in one cup part. Also, since the battery case is folded to form one edge of the secondary battery, only three edges except for the one edge may be sealed when a sealing process is performed later. Thus, the number of edges to be sealed may be reduced to improve a process rate and reduce the number of trimming processes.

FIG. 1 is a plan view of a pouch type secondary battery 3 according to the related art.

When a battery case is folded, and heat and a pressure are applied to seal the battery case, a portion of folded one edge of the secondary battery 3, i.e., a portion of a folding part 336 protrudes to the outside. This is called a bat ear 2.

As illustrated in FIG. 1, when the bat ear 2 protrudes, an unnecessary volume further increases, and thus an error occurs in a designed size of the secondary battery 3. Thus, when assembling the secondary batteries 3 to manufacture a battery module or the like, there is a problem in that it is not easy to assembly the secondary batteries 3, and each of the secondary batteries 3 has to be designed with a small size from the beginning. Also, since the volume of the secondary battery 3 increases as a whole, there is also a problem in that energy density to the volume decreases.

DISCLOSURE OF THE INVENTION

Technical Problem

An object to be achieved by the present invention is to provide a battery case for a secondary battery, which is capable of reducing an error in size and increasing in energy density to a volume, and a pouch type secondary battery.

The objects of the present invention are not limited to the aforementioned object, but other objects not described herein will be clearly understood by those skilled in the art from descriptions below.

Technical Solution

A pouch type battery case for a secondary battery, which accommodates an electrode assembly, in which electrodes and separators are stacked, according to an embodiment of the present invention for achieving the above object comprises: a first cup part and a second cup part, which are recessed in a pouch film, respectively; an accommodation part, which is provided in a longitudinal direction of edges of the first cup part and the second cup part, which face each other, between the first cup part and the second cup part and in which one side of the electrode assembly is configured to be accommodated; inclined parts extending from opposing ends, respectively, of the accommodation part and provided to be recessed in the pouch film; and line forming parts extending linearly from outer ends, respectively, of the respective inclined parts and provided to be recessed in the pouch film in the same direction as the longitudinal direction of the accommodation part.

In addition, in each inclined part, a ratio of a height up to the outer end to a length of an edge shared with an edge of one end of the accommodation part may be greater than 0.25.

In addition, in each inclined part, the ratio of the height up to the outer end to the length of the edge shared with the edge of the one end of the accommodation part may be less than 0.6.

In addition, each inclined part may have a polygonal shape and is recessed in the pouch film.

In addition, each inclined part may have a triangular or trapezoidal shape.

In addition, each inclined part may be recessed in an isosceles triangular shape.

In addition, in each inclined part, a vertex of the polygonal shape may be chamfered or filleted.

In addition, each inclined part may have a depth that gradually decreases from the accommodation part to the line forming part.

In addition, each line forming part may be recessed up to an edge of one side of the pouch film.

In addition, each line forming part may be recessed in a V shape.

In addition, each line forming part may be recessed in a U shape.

In addition, the accommodation part, the inclined parts, and the line forming parts may be formed together through one drawing process.

A pouch type secondary battery according to an embodiment of the present invention for achieving the above object includes: an electrode assembly, in which electrodes and separators are stacked; and a battery case configured to accommodate the electrode assembly therein, wherein the battery case includes: a first cup part and a second cup part, which are recessed in a pouch film, respectively; an accommodation part, which is provided in a longitudinal direction of edges of the first cup part and the second cup part, which face each other, between the first cup part and the second cup part and in which one side of the electrode assembly is accommodated; inclined parts extending from opposing ends, respectively, of the accommodation part and provided to be recessed in the pouch film; and line forming parts extending linearly from outer ends, respectively, of the respective inclined parts and provided to be recessed in the pouch film in the same direction as the longitudinal direction of the accommodation part.

In addition, in each inclined part, a ratio of a height up to the outer end to a length of an edge shared with an edge of one end of the accommodation part may be greater than 0.25.

In addition, in each inclined part, the ratio of the height up to the outer end to the length of the edge shared with the edge of the one end of the accommodation part may be less than 0.6.

Particularities of other embodiments are included in the detailed description and drawings.

Advantageous Effects

The embodiments of the present invention may have at least the following effects.

The bat ear may be prevented from protruding outward more than the bottom surface of the accommodation part to reduce the error occurring in the designed size of the secondary battery, and the secondary batteries may be easily assembled to manufacture the battery module.

In addition, since the unnecessary volume of the secondary battery decreases as a whole, the energy density to the volume may increase.

In addition, since the shapes of the cup part, the sealing part, and the inclined part are maintained without being deformed, and the battery case is folded, the electrode assembly may be stably accommodated in the cup part.

In addition, since the sealing parts of the battery case accurately contact each other and then are sealed, the sealing parts may be firmly sealed.

In addition, the bottom surface of the accommodation part may be prevented from being wrinkled.

The effects of the present invention are not limited by the aforementioned description, and thus, more varied effects are involved in this specification.

MODE FOR CARRYING OUT THE INVENTION

Figure 1:
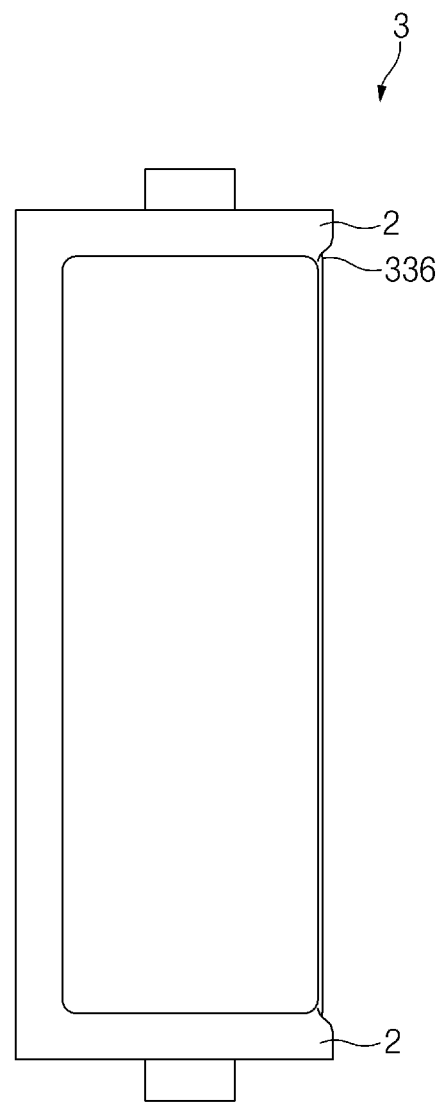
FIG. 1 is a plan view of a pouch type secondary battery according to a related art.

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

Figure 2:
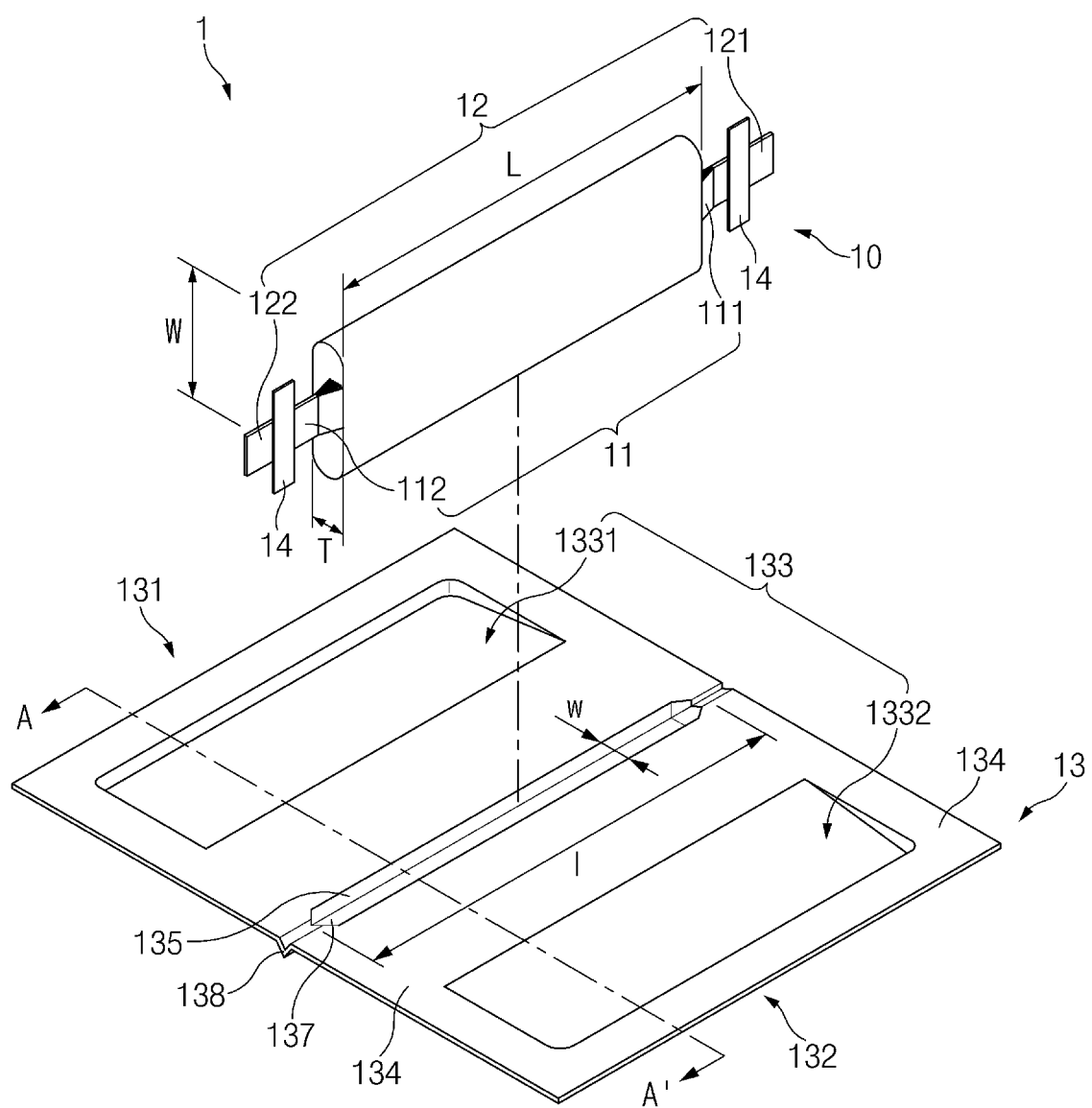
FIG. 2 is an assembly view of a pouch type secondary battery according to an embodiment of the present invention.
Figure 3:
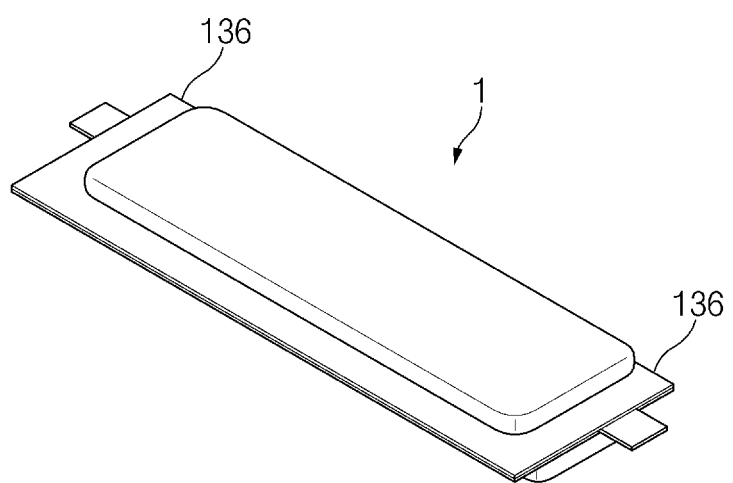
FIG. 3 is a perspective view of the pouch type secondary battery according to an embodiment of the present invention.

FIG. 2 is an assembly view of a pouch type secondary battery 1 according to an embodiment of the present invention, and FIG. 3 is a perspective view of the pouch type secondary battery 1 according to an embodiment of the present invention.

As illustrated in FIG. 2, the pouch type secondary battery 1 according to an embodiment of the present invention includes a pouch type battery case 13 and an electrode assembly 10 accommodated in the battery case 13.

The electrode assembly 10 may be a stacked structure including two electrodes such as a cathode and an anode and a separator interposed between the electrodes to insulate the electrodes from each other or disposed at a left or right side of one electrode. The stacked structure may have various shapes without being limited in shape. For example, the cathode and the anode, each of which has a predetermined standard, may be stacked with the separator therebetween, or the stacked structure may be wound in the form of a jelly roll. Each of the two electrodes has a structure in which active material slurry is applied to a metal foil or a mesh-shaped collector including aluminum and copper. The slurry may be usually formed by agitating a granular active material, an auxiliary conductor, a binder, and a plasticizer with a solvent added. The solvent may be removed in the subsequent process.

As illustrated in FIG. 2, the electrode assembly 10 includes the electrode tabs 11. The electrode tabs 11 are respectively connected to a positive electrode and a negative electrode of the electrode assembly 10 to protrude to the outside of the electrode assembly 10, thereby providing a path, through which electrons are moved, between the inside and outside of the electrode assembly 10. A collector of the electrode assembly 10 is constituted by a portion coated with an electrode active material and a distal end, on which the electrode active material is not applied, i.e., a non-coating portion. Also, each of the electrode tabs 11 may be formed by cutting the non-coating portion or by connecting a separate conductive member to the non-coating portion through ultrasonic welding. As illustrated in FIG. 2, the electrode tabs 11 may protrude in each of different directions of the electrode assembly 10, but is not limited thereto. For example, the electrode tabs may protrude in parallel to each other from one side in the same direction.

In the electrode assembly 10, the electrode lead 12 is connected to the electrode tab 11 through spot welding. Also, a portion of the electrode lead 12 is surrounded by an insulation part 14. An insulation part 14 may be disposed to be limited within a sealing part 134, at which a first case 131 and a second case 132 are thermally fused, so as to be bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 may extend in different directions or extend in the same direction according to the formation positions of the positive electrode tab 111 and the negative electrode tab 112. The positive electrode lead 121 and the negative electrode lead 122 may be made of materials different from each other. That is, the cathode lead 121 may be made of the same material as the cathode plate, i.e., an aluminum (Al) material, and the anode lead 122 may be made of the same material as the anode plate, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a flexible material and is manufactured by performing drawing molding on the pouch film having flexibility to form a cup part 133. Also, the battery case 13 accommodates the electrode assembly 10 so that a portion of the electrode lead 12, i.e., the terminal part is exposed and then is sealed. As illustrated in FIG. 2, the battery case 13 includes a first case 131 and a second case 132. A first cup part 1331 and a second cup part 1332 are respectively provided in the first case 131 and the second case 132 to provide an accommodation space in which the electrode assembly 10 is accommodated. Also, the battery case 13 is folded to allow the electrode assembly 10 to be accommodated in the accommodation space of the cup part 133, thereby preventing the electrode assembly 10 from being separated to the outside of the battery case 13.

When the two cup parts 133 are drawn and molded to be symmetrical to each other in the pouch film, an accommodation part 135 may be drawn and molded together between the two cup parts 133. As illustrated in FIG. 2, the accommodation part 135 is a space which is lengthily defined in a longitudinal direction of edges of the first cup part 1331 and the second cup part 1332, which face each other, and in which the electrode assembly 10 is accommodated first, between the first cup part 1331 and the second cup part 1332. The accommodation part 135 accommodates one side of the electrode assembly 10 first to fix a position of the one side of the electrode assembly 10 so that the electrode assembly 10 is easily accommodated in the cup part 133. For this, as illustrated in FIG. 2, the accommodation part 135 has a width W and length I, which respectively correspond to a thickness T and length L of the electrode assembly 10 and is disposed at a position spaced the same distance from the first cup part 1331 and the second cup part 1332. Thus, a central axis defined in a longitudinal direction of the accommodation part 135 functions as a symmetrical axis of the first cup part 1331 and the second cup part 1332.

When the electrode lead 12 is connected to the electrode tab 11 of the electrode assembly 10, and the insulation part 14 is disposed on a portion of the electrode lead 12, the electrode assembly 10 is accommodated in the accommodation part 135. Also, when the first case 131 and the second case 132 are folded, the electrode assembly 10 is accommodated in the accommodation space provided in the first and second cup parts 1331 and 1332, and then, the first and second cup parts 1331 and 1332 surround the electrode assembly 10. Also, an electrolyte is injected into the accommodation space, and sealing parts 134 disposed on edges of the first case 131 and the second case 132 are sealed. The electrolyte may move lithium ions generated by electrochemical reaction of the electrode during charging and discharging of the secondary battery 1. The electrolyte may include a non-aqueous organic electrolyte that is a mixture of a lithium salt and a high-purity organic solvent or a polymer using a polymer electrolyte. As illustrated in FIG. 3, the pouch type secondary battery 1 may be manufactured through the above-described method.

Figure 4:
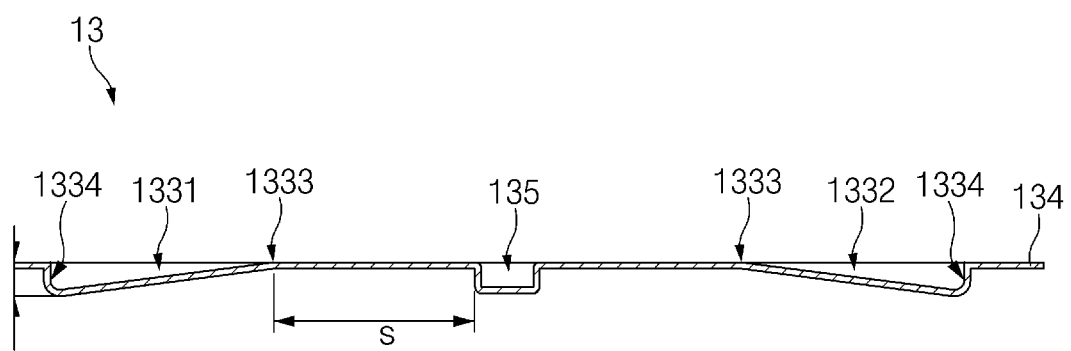
FIG. 4 is a cross-sectional view of a pouch type battery case, taken along line A-A' of FIG. 2, according to an embodiment of the present invention.

FIG. 4 is a cross-sectional view of the pouch type battery case 13, taken along line A-A' of FIG. 2, according to an embodiment of the present invention.

As illustrated in FIG. 4, the cup part 133 has a shape in which a depth d gradually increases from a portion 1333 corresponding to a central portion of the width W of the electrode assembly 10 toward a portion 1334 corresponding to an upper edge of the electrode assembly 10. Also, a section between the accommodation part 135 and the cup part 133 has a flat shape with little change in depth.

The deepest depth d in the cup part 133 is a portion corresponding to the upper edge of the electrode assembly 10, and the depth d is preferably deeper than half of the thickness T of the electrode assembly 10. Thereafter, when the first and second cup parts 1331 and 1332 face each other, and the sealing parts 134 of the battery case 13 are sealed, the cup part 133 accommodates the electrode assembly 10 therein. However, if the depth d of each of the first cup part 1331 and the second cup part 132 is not deeper than half of the thickness T of the electrode assembly 10, after the first cup part 1331 and the second cup part 1332 accommodate the electrode assembly 10 therein, the sealing parts 134 may not contact each other so as not to be sealed, or even if the sealing parts contact each other, a contact area is too narrow to cause sealing failure.

A section between the accommodation part 135 and the cup part 133 has a length S that varies according to the width W and thickness T of the electrode assembly 10. That is, it is preferable that the shorter the width W of the electrode assembly 10, the shorter the length S of the section between the accommodation part 135 and the cup part 133. On the other hand, it is preferable that the longer the width W of the electrode assembly 10, the longer the length S of the section between the accommodation part 135 and the cup part 133. Also, since the thicker the thickness T of the electrode assembly 10, the deeper the depth d of the cup part 133, it is preferable that that the length S of the section between the accommodation part 135 and the cup part 133 is shortened. On the other hand, since the thinner the thickness T of the electrode assembly 10, the shallower the depth d of the cup part 133, it is preferable that the length S of the section between the accommodation part 135 and the cup part 133 is longer.

Figure 5:
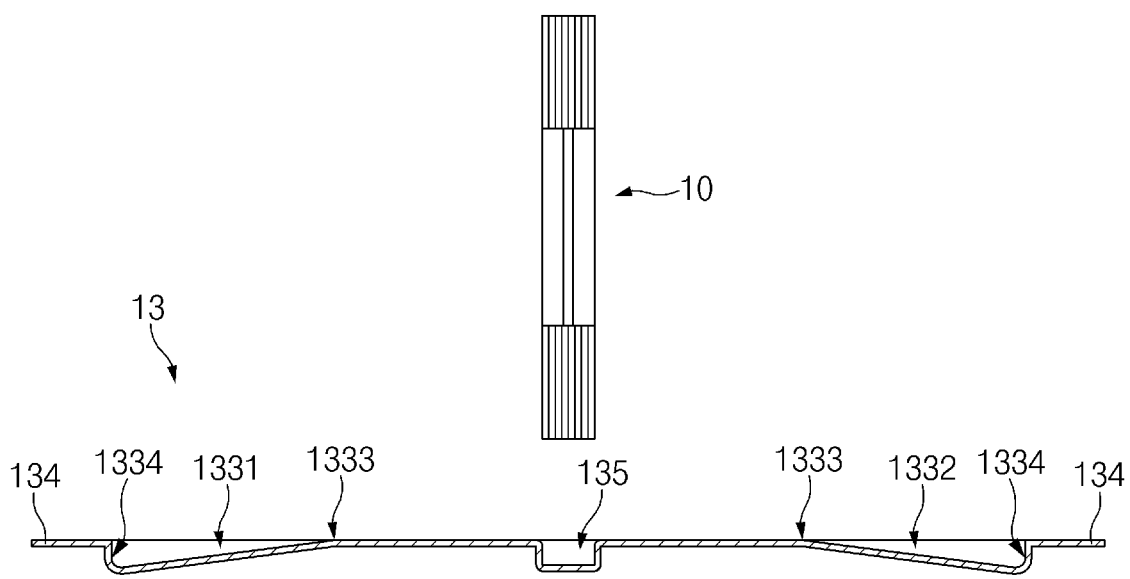
FIG. 5 is a cross-sectional view illustrating a state in which an electrode assembly is being accommodated in the pouch type battery case of FIG. 4.
Figure 6:
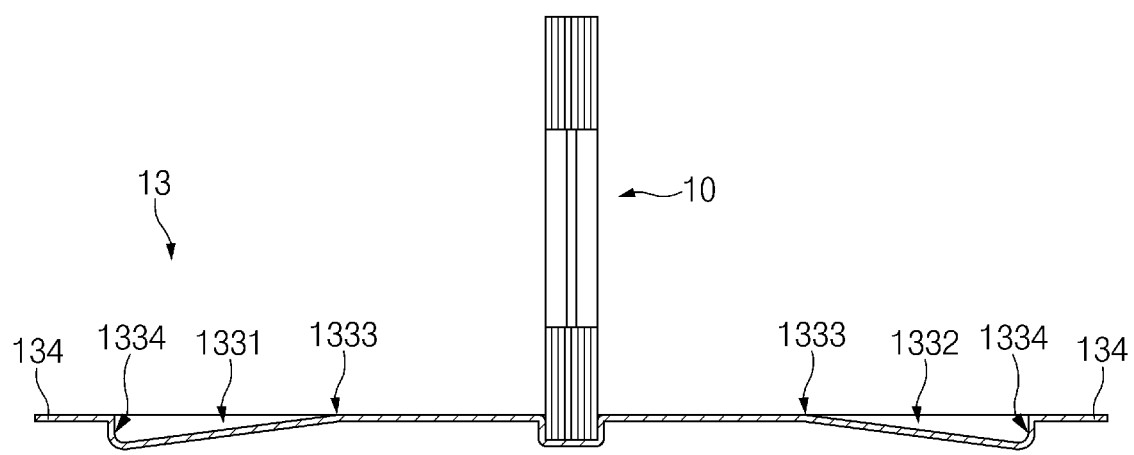
FIG. 6 is a cross-sectional view illustrating a state in which the electrode assembly is accommodated in the pouch type battery case of FIG. 4.

FIG. 5 is a cross-sectional view illustrating a state in which the electrode assembly 10 is being accommodated in the pouch type battery case 13 of FIG. 4, and FIG. 6 is a cross-sectional view illustrating a state in which the electrode assembly 10 is accommodated in the pouch type battery case 13 of FIG. 4.

The accommodation part 135 accommodates one side of the electrode assembly 10. Here, as illustrated in FIGS. 2 and 5, it is preferable that the electrode assembly 10 is accommodated upright from the top to the bottom. Thus, when the battery case 13 is folded later, the first and second cup parts 1331 and 1332 respectively disposed on both sides of the electrode assembly 10 may surround the electrode assembly 10 to accommodate the electrode assembly 10 therein.

As described above, since the accommodation part 135 has the width W and length I, which respectively correspond to the thickness T and length L of the electrode assembly 10, as illustrated in FIG. 6, the electrode assembly 10 may be easily accommodated in the accommodation part 135 and then fixed in position.

Figure 7:
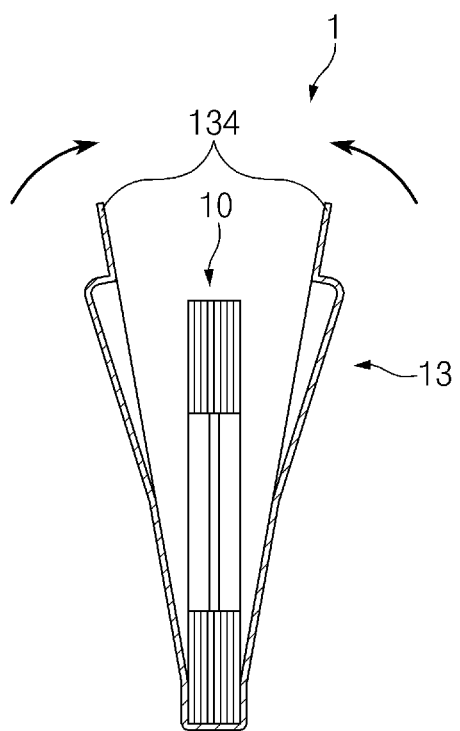
FIG. 7 is a cross-sectional view illustrating a state in which the pouch type battery case of FIG. 4 is being folded.
Figure 8:
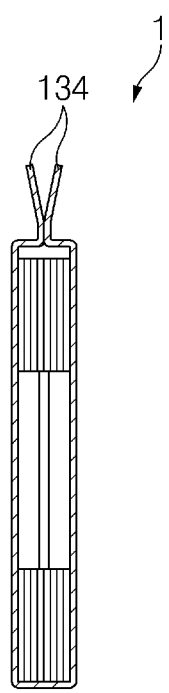
FIG. 8 is a cross-sectional view illustrating a state in which the pouch type battery case of FIG. 4 is folded.

FIG. 7 is a cross-sectional view illustrating a state in which the pouch type battery case 13 of FIG. 4 is being folded, and FIG. 8 is a cross-sectional view illustrating a state in which the pouch type battery case 13 of FIG. 4 is folded.

After the electrode assembly 10 is accommodated in the accommodation part 135, the first case 131 and the second case 132, which are respectively disposed at both sides of the accommodation part 135, are folded upward as illustrated in FIG. 7. As a result, as illustrated in FIG. 8, the two cup parts 133 may face each other to surround the electrode assembly 10 so that the electrode assembly 10 is accommodated in the accommodation space provided in the cup parts 133.

As illustrated in FIG. 4, the first case 131 and the second case 132 are respectively bent and connected at substantially right angles from both sidewalls that define the accommodating part 135. Also, when the first case 131 and the second case 132 are folded, the first and second cases 131 and 132, which are bent as illustrated in FIG. 8, are unfolded from both sidewalls of the accommodation part 135 to accommodate the electrode assembly 10 in the cup part 133. That is, the battery case 13 is folded when viewed as a whole, but the bent portion is unfolded when viewed from both the sidewalls of the accommodation part 135.

As described above, after the first case 131 and the second case 132 are folded, when the sealing part 134 is sealed using a sealing tool, the secondary battery 1 is completely manufactured.

Figure 9:
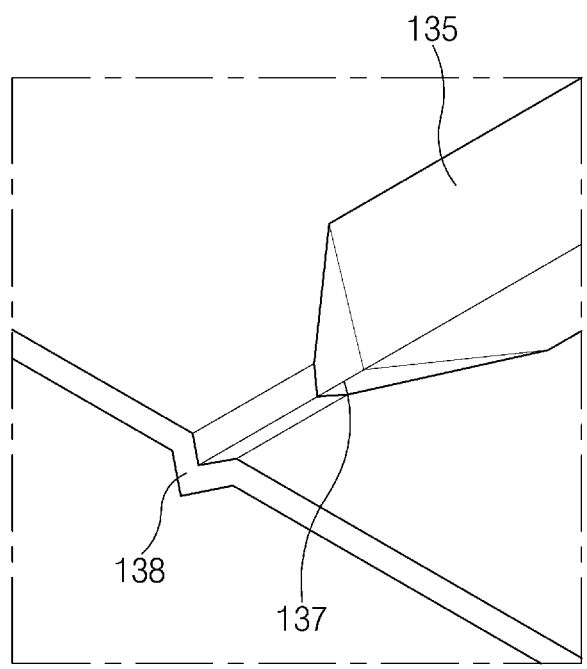
FIG. 9 is an enlarged perspective view of a line forming part according to an embodiment of the present invention.

FIG. 9 is an enlarged perspective view of a line forming part 138 according to an embodiment of the present invention.

According to an embodiment of the present invention, the bat ear 2 may be prevented from protruding outward more than a bottom surface of the accommodation part to reduce an error that occurs in a designed size of the secondary battery 1, and thus, the secondary batteries 1 may be easily assembled to form a battery module. Also, since the secondary battery 1 is reduced in volume as a whole, a ratio of an energy density to a volume may increase. Also, since the shapes of the cup part 133, the sealing part 134, and the inclined part 137 are maintained without being deformed, and the battery case 13 is folded, the electrode assembly 10 may be stably accommodated in the cup part 133. Also, since the sealing parts 134 of the battery case 13 accurately contact each other and then are sealed, the sealing parts 134 may be firmly sealed. In addition, the bottom surface of the accommodation part may be prevented from being wrinkled.

For this, the pouch type battery case 13 for the secondary battery 1, which accommodates an electrode assembly, in which electrodes and separators are stacked, according to an embodiment of the present invention includes: a first cup part 1331 and a second cup part 1332, which are defined to recessed in a pouch film, respectively; an accommodation part 135, which is provided in a longitudinal direction of edges of the first cup part 1331 and the second cup part 1332, which face each other, between the first cup part 1331 and the second cup part 1332 and in which one side of the electrode assembly 10 is accommodated; an inclined part 137 extending from both ends of the accommodation part 135 and provided to be recessed in the pouch film; and a line forming part 138 extending linearly from an outer end 1372 of the inclined part 137 and provided to be recessed in the pouch film in the same direction as the longitudinal direction of the accommodation part 135.

As described above, the accommodation part 135 is lengthily defined in a longitudinal direction of edges of the first cup part 1331 and the second cup part 1332, which face each other, between the first cup part 1331 and the second cup part 1332, and one side of the electrode assembly 10 is accommodated in the accommodation part 135. The accommodation part 135 is disposed to be spaced the same distance from the two cup parts 133, has a substantially rectangular shape, and is recessed lengthily to one side in the pouch film. Thus, a central axis defined in a longitudinal direction of the accommodation part 135 functions as a symmetrical axis of the two cup parts 133.

The inclined part 137 extends from both ends of the accommodation part 135 and is recessed in the pouch film. The inclined part 137 may have a triangular or trapezoidal polygon shape when viewed from an upper side of the pouch film and may be recessed in an isosceles triangle shape. Also, an edge corresponding to a bottom side of the inclined part 137 shares the same edge as edges corresponding to both ends of the accommodation part 135. However, the present invention is not limited thereto, and the inclined part 137 may have various shapes such as a semicircle or a semi-ellipse shape when viewed from above.

The inclined part 137 has the same depth as the accommodation part 135 at the accommodation part 135 and gradually decreases in depth from the accommodation part 135 toward the line forming part 138. In addition, the inclined part 137 may be smoothly connected to the line forming part 138 at an outer end 1372 (see FIG. 10) thereof and have the same depth as the line forming part 138. Thus, when viewed from a side surface of the pouch film, the inclined part 137 may have a substantially right triangle shape.

The line forming part 138 extends linearly from the outer end 1372 of the inclined part 137 and is recessed in the pouch film in the same direction as the longitudinal direction of the accommodation part 135. If the line forming part 138 is not provided, and the battery case 13 is simply folded, the first cup part 1331 and the second cup part 1332 may not face each other exactly, but may face each other to be misaligned with each other. As a result, the space inside the first cup part 1331 and the second cup part 1332, in which the electrode assembly 10 is accommodated may be deformed, and the shape of the sealing part 134 and the inclined part 137 may also modified. Therefore, there is a problem that the electrode assembly 10 is not stably accommodated. Also, since the sealing parts 134 of the battery case 13 do not exactly contact each other, the sealing may not be performed, or an area of the sealing part 134 may be excessively narrowed, resulting in poor sealing.

Therefore, according to an embodiment of the present invention, since the line forming part 138 is provided, and the battery case 13 is folded along the line forming part 138, the line forming part 138 guides the folding of the battery case 13. As a result, since the shapes of the cup part 133, the sealing part 134, and the inclined part 137 are maintained without being deformed, and the battery case 13 is folded, the electrode assembly 10 may be stably accommodated in the cup part 133. Also, since the sealing parts 134 of the battery case 13 accurately contact each other and then are sealed, the sealing parts 134 may be firmly sealed.

Since the line forming part 138 guides the folding of the battery case 13, the battery case 13 is folded with respect to the line forming part 138. Then, when the battery case 13 is folded, and the secondary battery 1 is completed, the folding part 136 that is a portion of the battery case 13, which is directly folded, is disposed at a position at which the line forming part 138 has been provided. The line forming part 138 may be recessed from the outer end 1372 of the inclined part 137 to one edge of the pouch film. Thus, the battery case 13 may be folded more easily.

Figure 10:
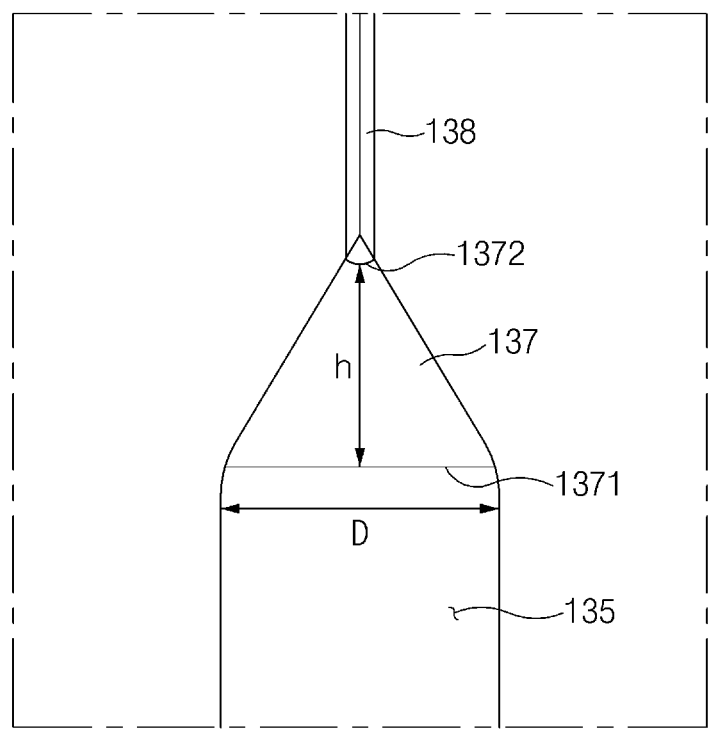
FIG. 10 is an enlarged plan view of an inclined part and the line forming part according to an embodiment of the present invention.

FIG. 10 is an enlarged plan view of the inclined part and the line forming part according to an embodiment of the present invention.

As described above, the inclined part 137 has a polygonal shape and may be recessed in the pouch film in a triangular or trapezoidal shape. Here, the formation of the polygonal shape is not limited to the dictionary meaning of the polygon, that is, a planar configuration having plural vertexes and straight edges. As illustrated in FIG. 10, the inclined part 137 may have various shapes as long as the inclined part 137 has a substantially polygonal shape without being limited to cases in which when the outer end 1372 of the inclined part 137 partially overlaps the line forming part 138, and thus, at least one vertex is chamfered, or two vertexes defining both ends of the edge 1371 corresponding to the bottom side of the inclined part are filleted.

As illustrated in FIG. 10, the inclined part 137 may be recessed in an isosceles triangular shape when the pouch film is viewed from above. That is, the two edges from both the ends of the edge 1371 corresponding to the bottom side of the inclined part 137 to the outer end 1372 of the inclined part 137 may have the same length. Here, the edge 1371 corresponding to the bottom side of the inclined part 137 shares the same edge as one end of the accommodation part 135 when the pouch film is viewed from above.

In the triangular or trapezoidal shape of the inclined part 137, it is preferable that a ratio of a height h up to the outer end 1372 to a depth D of the edge shared with the edge 1371 corresponding to the bottom side, i.e., the edge of the one end of the accommodation part 135 ranges of 0.25 to 0.6. If the ratio is less than 0.25, the folding part 136 may be provided from a position that is close to the accommodation part 135 until the battery case 13 is folded later. Therefore, since an area of the sealing part, on which the bat ear 2 is to be formed, is sufficient, and an angle between the accommodation part 135 and the bat ear 2 is sharply changed, the bat ear 2 protrudes outward as ever more than a height of the accommodation part 135 or protrudes as ever up to a height similar to that of the accommodation part 135. Also, a problem that a bottom surface 1351 of the accommodation part 135 is still wrinkled may occur. When the ratio is greater than 0.6, since the height of the inclined part 137 is excessively long, and a dead space increases after manufacturing the secondary battery 1, energy efficiency to a volume may decrease. Also, the electrode assembly 10 is not fixed to move inside the battery case 13, thereby deteriorating stability.

Here, it is preferable that a length D of an edge shared with the edge of the one end of the accommodation part 135 is the same as a width W of the accommodation part.

As illustrated in FIG. 10, all the accommodation part 135, the inclined part 137 and the line forming part 138 are connected to each other. Therefore, the accommodation part 135, the inclined part 137, and the line forming part 138 are not separately formed, but formed together in one drawing process on the pouch film. Therefore, the number of drawing processes performed on the pouch film may be reduced to increase in process rate.

Figure 11:
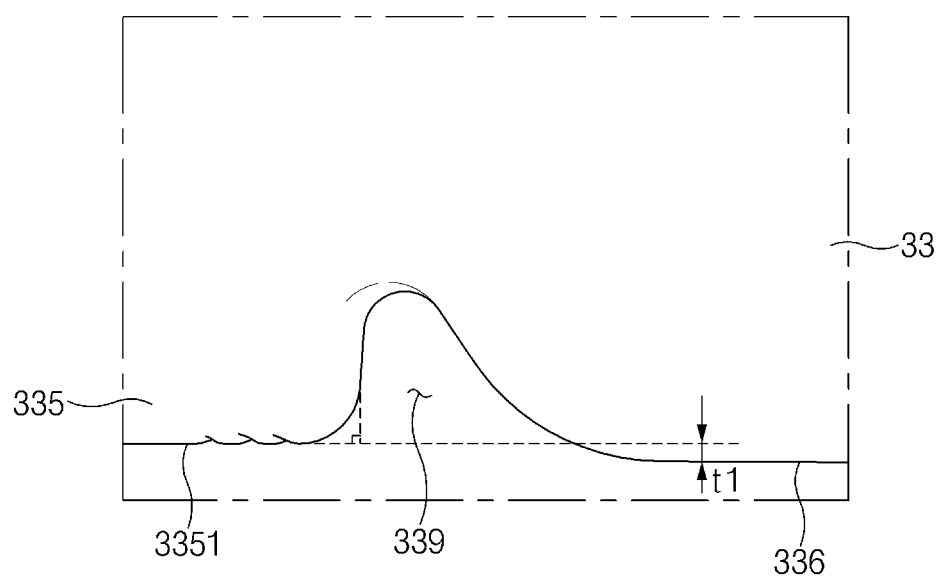
FIG. 11 is a partially enlarged side view of a battery case according to a related art.

FIG. 11 is a partially enlarged side view of the battery case according to the related art.

The folding part 136 is a portion that is directly folded at both ends of the accommodation part 135 in the battery case 13 when the battery case 13 is folded. Also, when the secondary battery 1 is viewed from the side, a recess part 139 in which an area between both the ends of the accommodation part 135 and the folding part 136 is recessed inward may be defined. However, in the related art, as illustrated in FIG. 11, since the inclined part 137 is not provided in the battery case 33, the recess part 339 is defined approximately vertically at both the ends of the accommodation part 335. Then, the folding part 336 is provided from a position that is very close to the accommodation part 335, and thus, the area of the sealing part 134, on which the bat ear 2 is to be formed is sufficient, and an angle between the accommodation part 335 and the bat ear 2 is sharply changed. Thus, the bat ear 2 may protrude outward more than the bottom surface 3351 of the accommodation part 335. Also, a problem that a bottom surface 3351 of the accommodation part 335 is wrinkled may occur.

Figure 12:
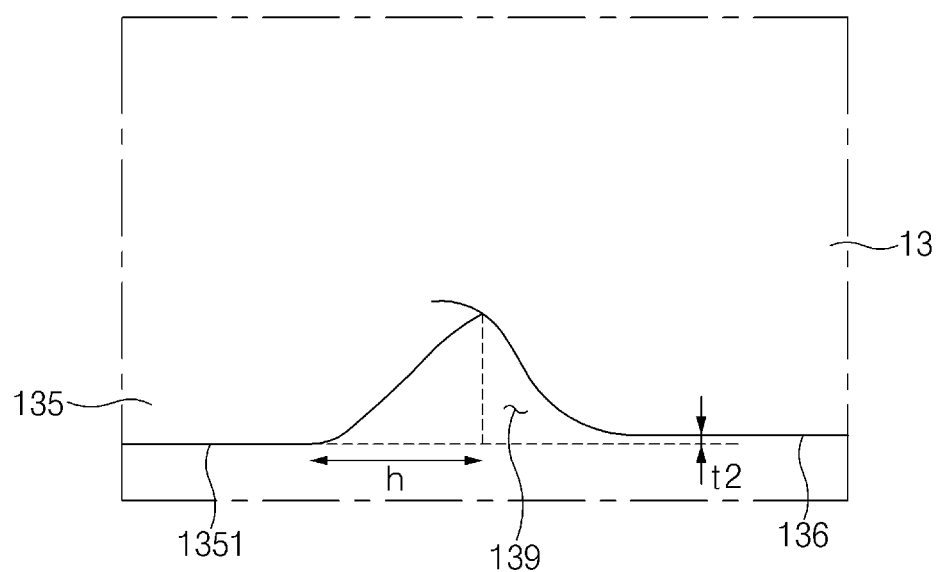
FIG. 12 is a partially enlarged side view of the battery case according to an embodiment of the present invention.

FIG. 12 is a partially enlarged side view of the battery case 13 according to an embodiment of the present invention.

As described above, since the inclined part 137 gradually decreases in depth from the accommodation part 135 toward the line forming part 138, when the inclined part 137 extends from both the ends of the accommodation part 135, the recess part 139 is recessed inward to a certain inclination. Then, as illustrated in FIG. 12, the folding part 136 is disposed at a position spaced apart from the accommodation part 135 to reduce the area of the sealing part 134, which is capable of forming the bat ear 2. Also, the angle between the accommodation part 135 and the bat ear 2 is changed gently to a certain degree. Thus, the bat ear 2 may be prevented from protruding outward more than the bottom surface 1351 of the accommodation part 135. Also, the bottom surface 1351 of the accommodation part 135 may be prevented from being wrinkled.

Figure 13:
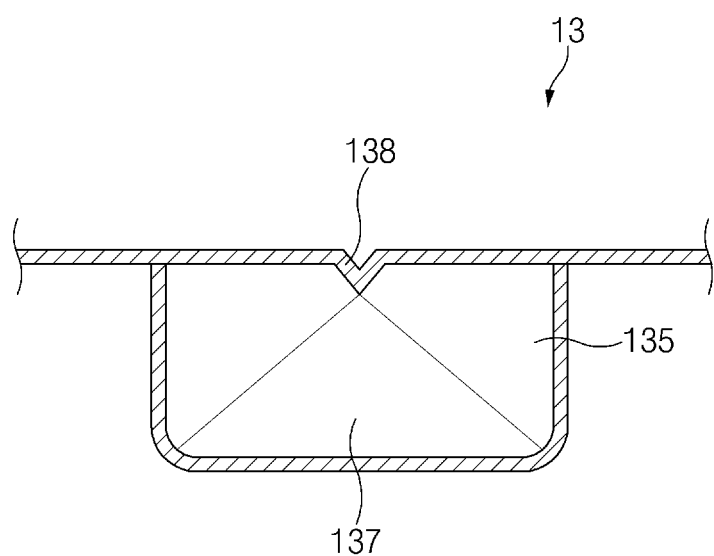
FIG. 13 is an enlarged front view of the line forming part according to an embodiment of the present invention.

FIG. 13 is an enlarged front view of the line forming part according to an embodiment of the present invention.

As described above, the line forming part 138 is recessed in the pouch film in a straight-line shape to guide the folding of the battery case 13. Here, according to an embodiment of the present invention, the line forming part 138 may be recessed in a V shape as illustrated in FIG. 13 to more easily guide the folding of the battery case 13. As a result, when the battery case 13 is folded, since the battery case 13 is folded with respect to a bent portion of the lowermost end of the line forming part 138, the shapes of the cup part 133, the sealing part 134, and the inclined part 137 may not be deformed but be firmly maintained, and thus, the battery case 13 may be easily folded.

Figure 14:
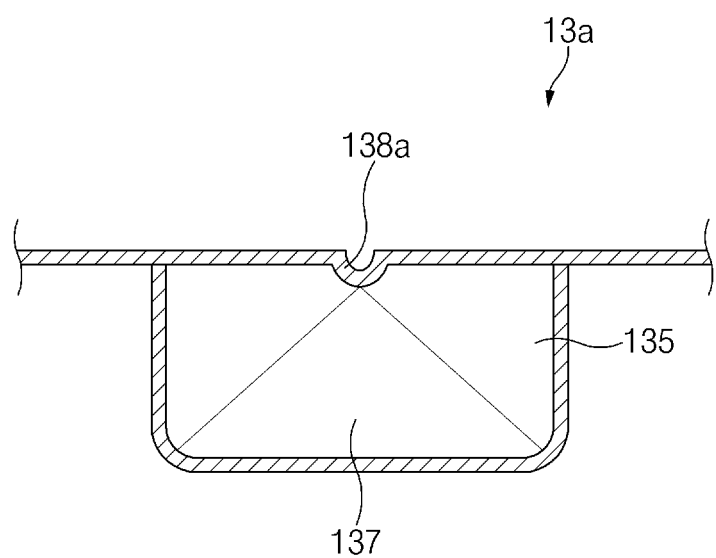
FIG. 14 is an enlarged front view of a line forming part according to another embodiment of the present invention.

FIG. 14 is an enlarged front view of a line forming part according to another embodiment of the present invention.

If a thickness of a pouch film is considerably thin, when a line forming part 138 is drawn and molded in a V shape, a bent portion of the lowermost end of the line forming part 138 may be damaged. Therefore, according to another embodiment of the present invention, when a thickness of the pouch film is considerably thin, the line forming part 138a may be recessed in a U shape, as illustrated in FIG. 14. As a result, the folding of the battery case 13a may be guided while preventing the pouch film from being damaged.

Manufacturing Example 1

First, a pouch film manufactured by sequentially stacking polypropylene (PP), aluminum (Al), and polyethylene terephthalate (PET) was prepared. Then, drawing molding was performed on the pouch film to form a first cup part, a second cup part, and an accommodation part. The first cup part and the second cup part were formed to be symmetrical to each other, and the accommodation part was formed lengthily between the first cup part and the second cup part in a longitudinal direction of edges facing each other. Each of the first cup part and the second cup part has a depth d of 0.6 cm, and a length S of a section between the accommodation part and the cup part is 3.85 cm. Also, a length l of the accommodation part is 32.25 cm, and a width W of the accommodation part is 1.1 cm.

When drawing the accommodation part, an inclined part extending from both ends of the accommodation part and a line forming part extending in a straight-line shape from an outer end of the inclined part were drawn and molded together. When molding the inclined part, the inclined part was molded so as to have a triangular shape when viewed from the above and gradually decrease in depth from the accommodation part toward the line forming part. Also, when molding the line forming part, the line forming part was molded in the same direction as a longitudinal direction of the accommodation part. In the inclined part, an edge shared with an edge of one end of the accommodation part has a length D of 1.1 cm, and a height h up to an outer edge is 0.3 cm. Accordingly, a ratio of the height h up to the outer end to the length D of the edge shared with the edge of the one end of the accommodation part is 0.273, i.e., ranges of 0.25 to 0.6. Also, when molding the line forming part, the line forming part was molded in a V shape.

The electrode assembly was accommodated upright from the top to the bottom in the accommodation part. The electrode assembly has a length L of 32.25 cm, a width W of 9.87 cm, and a thickness T of 0.11 cm. After the electrode assembly is accommodated in the accommodation part, the first case and the second case on both sides of the accommodation part were folded upward. Thereafter, the remaining edges except for the folded one edge was sealed using a sealing tool to manufacture a secondary battery.

Manufacturing Example 2

It was manufactured in the same manner as Manufacturing Example 1, except that a height h up to an outer end of an inclined part is 0.6 cm. Accordingly, a ratio of the height h up to the outer end to a length D of an edge shared with an edge of one end of an accommodation part is 0.545, i.e., ranges of 0.25 to 0.6.

Comparative Example

It was manufactured in the same manner as Manufacturing Example 1, except that an inclined part and a line forming part are not molded.

Method for Measuring Physical Property—Difference in Height of Bat Ear

In the secondary battery manufactured in Manufacturing Example 1, Manufacturing Example 2, and Comparative Example, a difference between the height of the bottom surface of the accommodation part and the bat ear was measured.

Result Obtained by Measuring Physical Property—Difference in Height of Bat Ear

In the secondary battery according to Comparative Example, since the inclined part is not formed, the folding part is formed at a position that is close to the accommodation part. Accordingly, a recess part is formed approximately vertically at both ends of the accommodation part. Also, an area of the sealing part, which is capable of forming the bat ear, is sufficiently large, and an angle between the accommodation part and the bat ear is changed sharply. Therefore, a difference t1 in height between the bat ear and the accommodation part is 0.4 cm, and the bat ear protrudes to a height approximately similar to that of the accommodation part.

On the other hand, in the secondary battery according to Manufacturing Example 1 and Manufacturing Example 2, since the inclined part is formed, the folding part is formed at a position spaced a certain distance from the accommodation part. Thus, the recess part is recessed inward at a certain inclination. Also, the area of the sealing part, which is capable of forming the bat ear, is reduced, and an angle between the accommodation part and the bat ear is changed gently to a certain degree. Therefore, according to Manufacturing Example 1, a difference t2 in height between the bat ear and the accommodation part is 0 cm. According to Manufacturing Example 2, a difference t2 in height between the bat ear and the accommodation part is −0.1 cm. That is, the bat ear protruding outward may be reduced in height to reduce an error occurring in a designed size of the secondary battery, and the secondary batteries may be easily assembled to manufacture the battery module.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A pouch type battery case for a secondary battery, which accommodates an electrode assembly, in which electrodes and separators are stacked, the battery case comprising:
a first cup part and a second cup part, which are recessed in a pouch film, respectively;
an accommodation part having a width dimension and a longitudinal dimension, the longitudinal dimension extending along a longitudinal direction of edges of the first cup part and the second cup part, which face each other, between the first cup part and the second cup part and in which one side of the electrode assembly is configured to be accommodated such that the one side of the electrode assembly is received within the width dimension of the accommodation part;
inclined parts extending from opposing ends, respectively, of the accommodation part and provided to be recessed in the pouch film; and
line forming parts extending linearly from outer ends, respectively, of the respective inclined parts and provided to be recessed in the pouch film in the same direction as the longitudinal dimension of the accommodation part.

2. The pouch type battery case of claim 1, wherein each inclined part includes a height and a length,
wherein the height is a distance between one of the opposing ends of the accommodation part and an outer end of the inclined part,
wherein the length is a distance of an edge shared by the inclined part and one of the opposing ends of the accommodation part, and
wherein a ratio of the height to the length is greater than 0.25.

3. The pouch type battery case of claim 2, wherein the ratio is less than 0.6.

4. The pouch type battery case of claim 1, wherein each inclined part has a polygonal shape.

5. The pouch type battery case of claim 4, wherein each inclined part has a triangular or trapezoidal shape.

6. The pouch type battery case of claim 5, wherein each inclined part is recessed in an isosceles triangular shape.

7. The pouch type battery case of claim 4, wherein, in each inclined part, a vertex of the polygonal shape is chamfered or filleted.

8. The pouch type battery case of claim 1, wherein each inclined part has a depth that gradually decreases from the accommodation part to the line forming part.

9. The pouch type battery case of claim 1, wherein each line forming part is recessed up to an edge of one side of the pouch film.

10. The pouch type battery case of claim 1, wherein each line forming part is recessed in a V shape.

11. The pouch type battery case of claim 1, wherein each line forming part is recessed in a U shape.

12. The pouch type battery case of claim 1, wherein the accommodation part, the inclined parts, and the line forming parts are formed together through one drawing process.

13. A pouch type secondary battery comprising:
an electrode assembly, in which electrodes and separators are stacked; and
a battery case configured to accommodate the electrode assembly therein,
wherein the battery case comprises:
a first cup part and a second cup part, which are recessed in a pouch film, respectively;
an accommodation part having a width dimension and a longitudinal dimension, the longitudinal dimension extending along a longitudinal direction of edges of the first cup part and the second cup part, which face each other, between the first cup part and the second cup part and in which one side of the electrode assembly is accommodated such that the one side of the electrode assembly is received within the width dimension of the accommodation part;
inclined parts extending from opposing ends, respectively, of the accommodation part and provided to be recessed in the pouch film; and
line forming parts extending linearly from outer ends, respectively, of the respective inclined parts and provided to be recessed in the pouch film in the same direction as the longitudinal dimension of the accommodation part.

14. The pouch type secondary battery of claim 13, wherein, in each inclined part includes a height and a length,
wherein the height is a distance between one of the opposing ends of the accommodation part and an outer end of the inclined part,
wherein the length is a distance of an edge shared by the inclined part and one of the opposing ends of the accommodation part, and
wherein a ratio of the height to the length is greater than 0.25.

15. The pouch type secondary battery of claim 14, wherein the ratio is less than 0.6.

\* \* \* \* \*